(12) United States Patent
Moy et al.

(10) Patent No.: US 6,827,919 B1
(45) Date of Patent: Dec. 7, 2004

(54) PROCESS FOR PRODUCING SINGLE WALL NANOTUBES USING UNSUPPORTED METAL CATALYSTS AND SINGLE WALL NANOTUBES PRODUCED ACCORDING TO THIS METHOD

(75) Inventors: David Moy, Winchester, MA (US); Asif Chishti, Lowell, MA (US)

(73) Assignee: Hyperion Catalysis International, Inc., Cambridge, MA (US)

(*) Notice: Subject to any disclaimer, the term of this patent is extended or adjusted under 35 U.S.C. 154(b) by 156 days.

(21) Appl. No.: 09/607,126

(22) Filed: Jun. 29, 2000

Related U.S. Application Data

(63) Continuation of application No. 08/910,495, filed on Aug. 4, 1997, now Pat. No. 6,221,330.

(51) Int. Cl.$^7$ .................................................. D01F 9/12
(52) U.S. Cl. .................................................. 423/447.3
(58) Field of Search ...................................... 423/447.3

(56) References Cited

U.S. PATENT DOCUMENTS

| | | | | |
|---|---|---|---|---|
| 4,572,813 A | 2/1986 | Arakawa | .................... | 264/29.2 |
| 4,876,078 A | 10/1989 | Arakawa et al. | .......... | 423/447.3 |
| 5,039,504 A | 8/1991 | Kageyama et al. | ...... | 423/447.3 |
| 5,374,415 A | 12/1994 | Alig et al. | ................ | 423/447.3 |
| 5,424,054 A | 6/1995 | Bethune et al. | ........... | 423/447.2 |
| 6,221,330 B1 * | 4/2001 | Moy et al. | ................ | 423/447.3 |

FOREIGN PATENT DOCUMENTS

| | | | | |
|---|---|---|---|---|
| GB | 2248230 | 1/1992 | .............. | 423/447.3 |
| JP | 06-322615 | 11/1994 | | |
| JP | 09-188509 | 7/1997 | | |

OTHER PUBLICATIONS

Sen et al. 'Carbon Nanotubes by the Metallocene Route' in Chemical Physics Letters vol. 267 pp. 276–280, Mar. 1997.*
Kiang et al. 'Carbon Nanotubes With Single–Layer Walls' in Carbon vol. 33 #7 pp. 903–914, 1995.*
Qin, L.C. "CVD Synthesis of Carbon Nanotubes", *J. Materials Science Letters*, vol. 16, No. 6, pp. 457–459 (Mar. 1997).

Sen, R. et al. "Carbon Nanotubes by the Metallocene Route", *Chem. Phys. Lett.*, vol. 267, pp. 276–280 (Mar. 1997).
Endo, et al., "Grow Carbon Fibers in the Vapor Phase", *Chemtech*, pp. 568–576 (Sep. 1, 1988).
Endo, et al., "The Production and Structure of Pyrolytic Carbon Nanotubes (PCNTs)," *J. Phys. Chem. Solids*, vol. 54, No. 12, pp. 1841–1848 (1993).
Ebbesen, et al., "Large–Scale synthesis of carbon nanotubes", *Nature*, vol. 358, pp. 220–222 (Jul. 16, 1992).
Iijima, et al. "Pentagons, heptagons and negative curvature in graphite microtubule growth", *Nature*, vol. 356, pp. 776–778 (1992).
Sumio Iijima, "Helical microtubules of graphitic carbon", *Nature*, vol. 354, No. 6348, pp. 56–58 (Nov. 7, 1991).
Dai, et al., "Single–Wall Nanotubes Produced by Metal–Catalyzed Disproportionation of Carbon Monoxide", *Chemical Physics Letters*, vol. 260, pp. 471–475 (Sep. 27, 1996).
Terrones, et al., "Controlled Production of Aligned–Nanotube Bundles", *Nature*, pp. 52–55, (Jul. 1997).
Thess, et al., "Crystalline Ropes of Metallic Carbon Nanotubes", *Science*, vol. 272, pp. 483–487, (Jul. 26, 1996).
Guo, et al., "Catalytic Growth of Single–Walled Nanotubes by Laser Vaporization", *Chemical Physics Letter*, pp. 49–55 (1995).
Kiang, C–H. et al., "Carbon Nanotubes with Single–Layer Walls", *Carbon*, vol. 33, pp. 903–914 (1995).

* cited by examiner

*Primary Examiner*—Stuart Hendrickson
(74) *Attorney, Agent, or Firm*—Kramer Levin Naftalis & Frankel LLP; Barry Evans, Esq.

(57) ABSTRACT

A process for producing hollow, single-walled carbon nanotubes by catalytic decomposition of one or more gaseous carbon compounds by first forming a gas phase mixture carbon feed stock gas comprising one or more gaseous carbon compounds, each having one to six carbon atoms and only H, O, N, S or Cl as hetero atoms, optionally admixed with hydrogen, and a gas phase metal containing compound which is unstable under reaction conditions for said decomposition, and which forms a metal containing catalyst which acts as a decomposition catalyst under reaction conditions; and then conducting said decomposition reaction under decomposition reaction conditions, thereby producing said nanotubes.

30 Claims, 2 Drawing Sheets

PROCESS FOR PRODUCING SINGLE WALL NANOTUBES USING UNSUPPORTED METAL CATALYSTS AND SINGLE WALL NANOTUBES PRODUCED ACCORDING TO THIS METHOD

This application is a continuation of application Ser. No. 08/910,495 filed Aug. 4, 1997, now U.S. Pat. No. 6,221,330, which is incorporated herein by reference.

BACKGROUND OF THE INVENTION

1. Field of the Invention

This invention relates to a method for producing single wall carbon nanotubes, also known as linear fullerenes, employing unsupported metal containing catalysts, for decomposition of a $C_1$ to $C_6$ carbon feedstock such as carbon monoxide.

2. Description of the Related Art

Multi-Walled Carbon Nanotubes

Multi-walled carbon nanotubes, or fibrils, are well-known. Typically, carbon fibrils have a core region comprising a series of graphitic layers of carbon.

Since the 1970's, carbon nanotubes and fibrils have been identified as materials of interest for a variety of applications. Submicron graphitic fibrils belong to a class of materials sometimes called vapor grown carbon fibers. Carbon fibrils are vermicular carbon deposits having diameters less than approximately 1.0 $\mu$. They exist in a variety of forms and have been prepared through the catalytic decomposition of various carbon-containing gases at metal surfaces. Such vermicular carbon deposits have been observed almost since the advent of electron microscopy. A good early survey and reference is found in Baker and Harris, *Chemistry and Physics of Carbon*, Walker and Thrower ed., Vol. 14, 1978, p. 83, and in Rodriguez, N., *J. Mater. Research*, Vol. 8, p. 3233 (1993).

Carbon fibrils were seen to originate from a metal catalyst particle which, in the presence of a hydrocarbon containing gas, became supersaturated in carbon. A cylindrical ordered graphitic core is extruded which immediately became coated with an outer layer of pyrolytically deposited graphite. These fibrils with a pyrolytic overcoat typically have diameters in excess of 0.1 $\mu$. (Oberlin, A. and Endo, M.,*J. Crystal Growth*, 32:335–349 (1976)).

Tibbetts has described the formation of straight carbon fibers through pyrolysis of natural gas at temperatures of 950°–1075° C., *Appl. Phys. Lett.* 42(8):666(18\983). The fibers are if reported to grow in two stages where the fibers first lengthen catalytically and then thicken by pyrolytic deposition of carbon. Tibbetts reports that these stages are "overlapping", and is unable to grow filaments free of pyrolytically deposited carbon. In addition, Tibbett's approach is commercially impracticable for at least two reasons. First, initiation of fiber growth occurs only after slow carbonization of the steel tube (typically about ten hours), leading to a low overall rate of fiber production. Second, the reaction tube is consumed in the fiber forming process, making commercial scale-up difficult and expensive.

In 1983, Tennent, U.S. Pat. No. 4,663,230 succeeded in growing cylindrical ordered graphite cores, uncontaminated with pyrolytic carbon, resulting in smaller diameter fibrils, typically 35 to 700 Å (0.0035 to 0.070 $\mu$), and an ordered "as grown" graphitic surface. Tennent '230 describes carbon fibrils free of a continuous thermal carbon overcoat and having multiple graphitic outer layers that are substantially parallel to the fibril axis. They may be characterized as having their c-axes, (the axes which are perpendicular to the tangents of the curved layers of graphite) substantially perpendicular to their cylindrical axes, and having diameters no greater than 0.1 $\mu$ and length to diameter ratios of at least 5.

Tennent, et al., U.S. Pat. No. 5,171,560 describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 0.1 $\mu$ and a length to diameter ratio of greater than 5.

Moy et al., U.S. Ser. No. 07/887,307 filed May 22, 1992, describes fibrils prepared as aggregates having various macroscopic morphologies (as determined by scanning electron microscopy) including morphologies resembling bird nests ("BN"), combed yarn ("CY") or "open net" ("ON") structures.

Multi-walled carbon nanotubes of a morphology similar to the catalytic grown fibrils described above have been grown in a high temperature carbon arc (Iijima, *Nature* 354:56 1991). (Iijima also describes in a later publication arc-grown single-walled nanotubes having only a single layer of carbon arranged in the form of linear Fullerene.) It is now generally accepted (Weaver, *Science* 265: 1994) that these arc-grown nanofibers have the same morphology as the earlier catalytically grown fibrils of Tennet.

As mentioned above, the Iijima method partially results in single-walled nanotubes, i.e., nanotubes having only a single layer of carbon arranged in the form of a linear Fullerene.

U.S. Pat. No. 5,424,054 to Bethune et al. describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are discussed, for instance laser heating, electron beam heating and RF induction heating.

Smalley (Guo, T., Nikoleev, P., Thess, A., Colbert, D. T., and Smally, R. E., *Chem. Phys. Lett.* 243: 1–12 (1995)) describes a method of producing single-walled carbon nanotubes wherein graphite rods and a transition metal are simultaneously vaporized by a high-temperature laser.

Smalley (Thess, A., Lee, R., Nikolaev, P. Dai, H, Petit, P., Robert, J., Xu, C., Lee, Y. H., Kim, S. G. Rinzler, A. G., Colbert, D. T., Scuseria, G. E., Tonàrek, D., Fischer, J. E., and Smalley, R. E., *Science* 273: 483–487 (1996)) also describes a process for production of single-waved carbon nanotubes in which a graphite rod containing a small amount of transition metal is laser vaporized in an oven at about 1200° C. Single-wall nanotubes were reported to be produced in yields of more than 70%.

Each of the techniques described above employs solid carbon as the carbon feedstock. These techniques are inherently disadvantages. Specifically, solid carbon vaporization via electric arc or laser apparatus is costly and difficult to operate on the commercial or industrial scale.

Supported metal catalysts for formation of SWNT are also known. Smalley (Dai., H., Rinzler, A. G., Nikolaev, P., Thess, A., Colbert, D. T., and Smalley, R. E., *Chem. Phys. Lett.* 260: 471–475 (1996)) describes supported Co, Ni and Mo catalysts for growth of both multi-walled nanotubes and single-walled nanotubes from CO, and a proposed mechanism for their formation.

However, supported metal catalysts are inherently disadvantageous, as the support is necessarily incorporated into the single-walled carbon nanotube formed therefrom. Single-walled nanotubes contaminated with the support material are obviously less desirable compared to single-walled nanotubes not having such contamination.

OBJECTS OF THE INVENTION

It is thus an object of the present invention to provide a method of producing single-walled carbon nanotubes which employs a gaseous carbon feedstock.

It is an object of this invention to provide a method of producing single-walled carbon nanotubes which employs a gas phase, metal containing compound which forms a metal containing catalyst.

It is also an object of the invention to provide a method of producing single-walled carbon nanotubes which employs an unsupported catalyst.

It is a further object of this invention to provide a method of producing single-walled carbon nanotubes which employs a gaseous carbon feedstock and an unsupported gas phase metal containing compound which forms a metal containing catalyst.

SUMMARY OF THE INVENTION

The invention relates to a gas phase reaction in which a gas phase metal containing compound is introduced into a reaction mixture also containing a gaseous carbon source. The carbon source is typically a $C_1$ through $C_6$ compound having as hetero atoms H, O, N, S or Cl, optionally mixed with hydrogen. Carbon monoxide or carbon monoxide and hydrogen is a preferred carbon feedstock.

Increased reaction zone temperatures of approximately 400° C. to 1300° C. and pressures of between −0 and −100 p.s.i.g., are believed to cause decomposition of the gas phase metal containing compound to a metal containing catalyst. Decomposition may be to the atomic metal or to a partially decomposed intermediate species. The metal containing catalysts (1) catalyze CO decomposition and (2) catalyze SWNT formation. Thus, the invention also relates to forming SWNT via catalytic decomposition of a carbon compound.

The invention may in some embodiments employ an aerosol technique in which aerosols of metal containing catalysts are introduced into the reaction mixture. An advantage of an aerosol method for producing SWNT is that it will be possible to produce catalyst particles of uniform size and scale such a method for efficient and continuous commercial or industrial production. The previously discussed electric arc discharge and laser deposition methods cannot economically be scaled up for such commercial or industrial production.

Examples of metal containing compounds useful in the invention include metal carbonyls, metal acetyl acetonates, and other materials which under decomposition conditions can be introduced as a vapor which decomposes to form an unsupported metal catalyst.

Catalytically active metals include Fe, Co, Mn, Ni and Mo. Molybdenum carbonyls and Iron carbonyls are the preferred metal containing compounds which can be decomposed under reaction conditions to form vapor phase catalyst. Solid forms of these metal carbonyls may be delivered to a pretreatment zone where they are vaporized, thereby becoming the vapor phase precursor of the catalyst.

DESCRIPTION OF PREFERRED EMBODIMENTS

It has been found that two methods may be employed to form SWNT on unsupported catalysts. The first method is the direct injection of volatile catalyst. The direct injection method is described is copending application Ser. No. 08/459,534, incorporated herein by reference.

Direct injection of volatile catalyst precursors has been found to result in the formation of SWNT using molybdenum hexacarbonyl [$Mo(CO)_6$] and dicobalt octacarbonyl [$Co_2(CO)_8$] catalysts. Both materials are solids at room temperature, but sublime at ambient or near-ambient temperatures—the molybdenum compound is thermally stable to at least 150°, the cobalt compound sublimes with decomposition "Organic Syntheses via Metal Carbonyls," Vol. 1, I. Wender and P. Pino, eds., Interscience Publishers, New York, 1968, p. 40).

Figure 2:
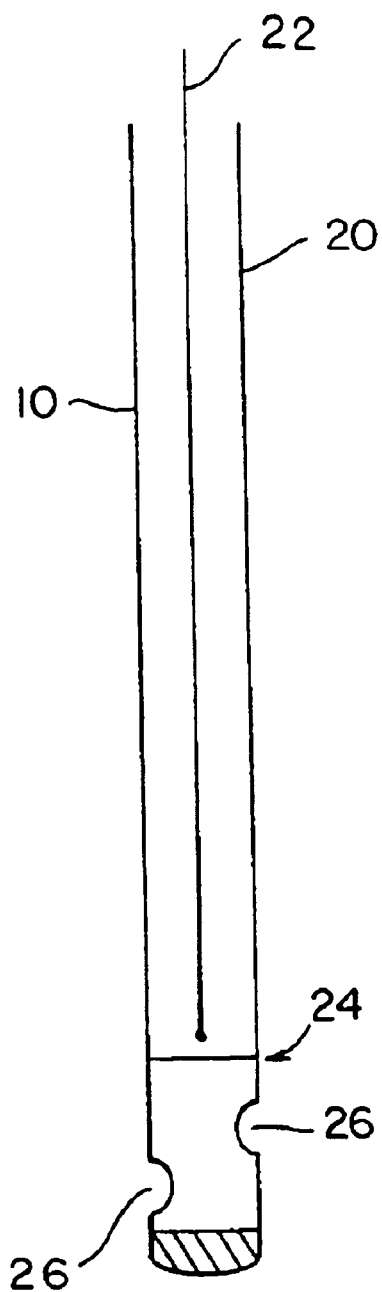
FIG. 2 illustrates the vaporizer component of the reactor described in FIG. 1.

The second method uses a vaporizer to introduce the metal containing compound (FIG. 2).

In one preferred embodiment of the invention, the vaporizer 10, shown at FIG. 2, comprises a quartz thermowell 20 having a seal 24 about 1" from its bottom to form a second compartment. This compartment has two ¼" holes 26 which are open and exposed to the reactant gases. The catalyst is placed into this compartment, and then vaporized at any desired temperature using a vaporizer furnace 32. This furnace is controlled using a first thermocouple 22.

A metal containing compound, preferably a metal ill carbonyl, is vaporized at a temperature below its decomposition point, reactant gases CO or $CO/H_2$ sweep the precursor into the reaction zone 34, which is controlled separately by a reaction zone furnace 38 and second thermocouple 42.

Figure 1:
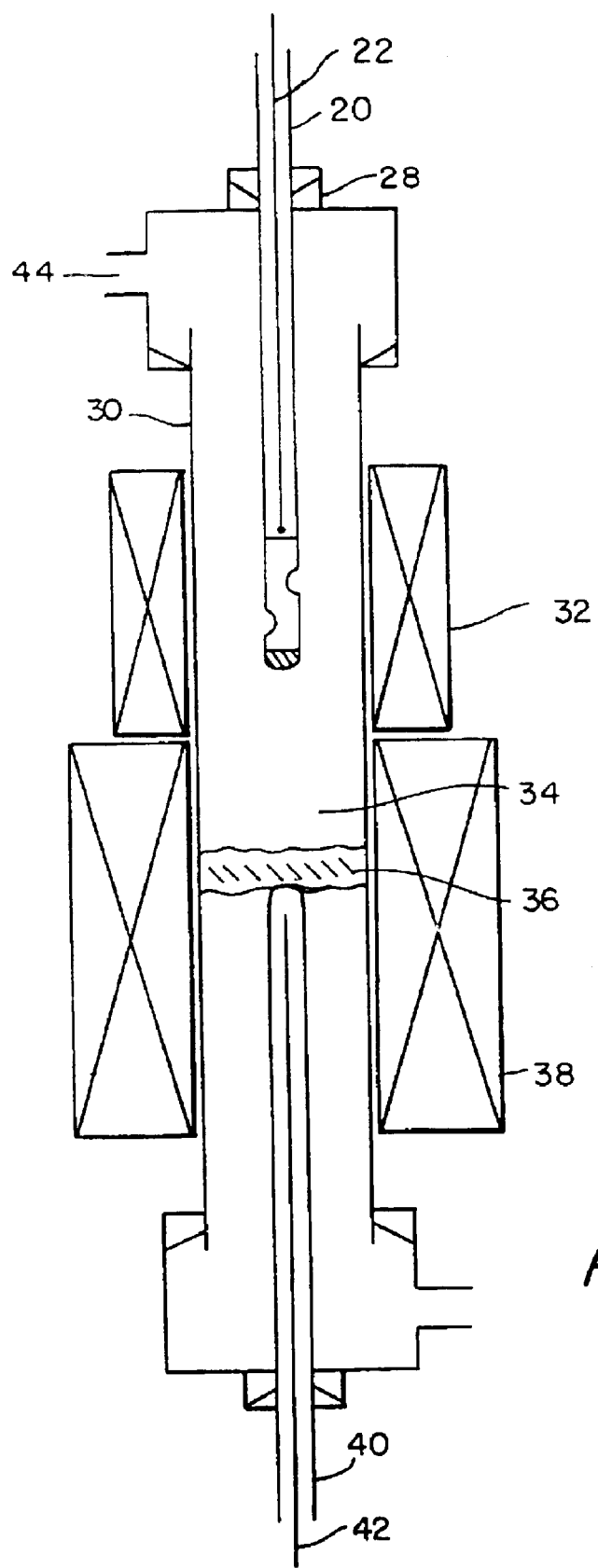
FIG. 1 illustrates a reactor capable of producing SWNT.

Although applicants do not wish to be limited to a particular theory of operability, it is believed that at the reactor temperature, the metal containing compound is decomposed either partially to an intermediate species or completely to metal atoms. These intermediate species and/or metal atoms coalesce to larger aggregate particles which are the actual catalyst. The particle then grows to the correct size to both catalyze the decomposition of CO and promote SWNT growth. In the apparatus of FIG. 1, the catalyst particles and the resultant carbon forms are collected on the quartz wool plug 36.

Rate of growth of the particles depends on the concentration of the gas phase metal containing intermediate species. This concentration is determined by the vapor pressure (and therefore the temperature) in the vaporizer. If the concentration is too high, particle growth is too rapid, and structures other than SENT are grown (e.g., MWNT, amorphous carbon, onions, etc.).

Examples 5 and 6 show many areas of SWNT along with MWNT and other carbon structures. Mo particles ranged from <1–10 nm. In Example 4, mainly MWNT were formed along with other structures of carbon. Mo particles ranged from ~1–50 nm. Presumably, the particles generated in Examples 5 and 6 were the right size to promote SWNT growth over the other forms possible. In Example 4, particle sizes favored growth of MWNT and other forms.

EXAMPLES

Example 1

In a direct injection process, the catalyst compartment was loaded with ~40 mg Molybdenum hexacarbonyl [Mo $(CO)_6$] which has been ground to ~–100 mesh. The reactor was heated to 900° C. under an argon flow. Argon was then replaced with CO at atmospheric pressure at a flow of ~0.8 SLM and the catalyst was injected.

The flow of CO was continued for 30 min. at 900° C., after which it was replaced by argon, and the reactor furnace turned off. After cooling to ambient temperature, the entire contents of the reactor including the quartz wool plug which had been tared prior to the run, was emptied into a tared plastic bag. The quartz wool plug was blackened, but the yield of carbon growth (wgt C/wgt catalyst) was <1.

A specimen for Transmission Electron Microscopy (TEM) was prepared by shaking the quartz wool plug in ethanol in a glass vial and ultrasounding the ethanol for ~2 min. This procedure dispersed the black particles from the quartz wool. A TEM grid was prepared by evaporating several drops of this dispersion onto a carbon-coated copper grid.

Examination of the grid in the TEM showed a mixture of particles and carbon nanotubes, both MW and SW. Particles varied from ~1—several hundred nm and were shown to be Mo by dispersive X-ray analysis. The MWNT ranged from ~4–10 nm diameter. Fishbone fibrils (10–50 nm diameter) were also formed.

Examination of the grid also showed several areas containing SWNT. Diameters ranged between 1–2 nm. TEM estimate of the yield of SWNT was <50% of the carbon formed.

Example 2

The procedure of Ex. 1 was used to produce a mixture of Mo particles and carbon structures including both MWNT and SWNT. Catalyst charge [$Mo(CO)_6$] was ~8 mg. SWNT yield was <50% of all nanotubes produced.

Example 3

The procedure of Example 1 was used to grow SWNT using ~22 mg $Co_2(CO)_8$ as catalyst. TEM analysis revealed Co particles to be the major component. MWNT and SWNT ranging in diameter from 1–2 nm were also formed. Estimated yield of SWNT was <25% of the nanotubes formed.

Example 4

A simulated aerosol reactor (FIG. 1) was used to produce SWNT. As the catalyst sublimed in the vaporizer, the vapors were swept by the reactant gases into the reaction section if where they underwent immediate thermal decomposition to Mo atoms and CO. It is theorized that the Mo atoms aggregated and promoted growth of carbon structures, including SWNT. These were caught on the quartz wool plug.

Approximately 20 Mg of $Mo(C)_6$ was loaded into the vaporizer. Under argon at atmospheric pressure, the reactor section was heated to 900° C. while keeping the vaporizer at ambient temperature. The argon stream was then changed to CO @~0.8 SLM and $H_2$ @~0.08 SLM, and while maintaining 900° in the reactor, the vaporizer temperature was raised to 70° C. Over the course of the run (1.5 hrs) the vaporizer temperature rose to 80° C. due to heat from the reactor furnace. The vapor pressure of $Mo(CO)_6$ varied from 0.6–10 torr.

TEM specimens were made by the same procedure as Ex. 1. TEM examination showed mainly very small particles of Mo ranging from ~1–10 nm. Also produced were amorphous carbon structures and MWNT with diameters ~4 nm. SWNT with diameters ~1.5 nm were also produced, but in low yield.

Example 5

A procedure similar to Ex. 4 where ~20 mg $Mo(CO)_6$ was loaded in the vaporizer. With the reactor at atmospheric pressure at 900° C., the vaporizer temperature was set at 40° C. and CO was fed to the system @~0.8 SLM. Over the course of the run (1.5 hrs) the vaporizer temperature rose to 57° C. For this temperature span, the vapor pressure of $Mo(CO)_6$ ranged from 0.6–2 torr.

TEM examination showed mainly Mo nanoparticles 1–10 nm in diameter along with various carbon structures. These included amorphous carbon and MWNT with diameters of 4–10 nm. However, also produced were SWNT with diameters varying from ~1–3 nm. Estimated yield of SWNT was <20% of the nanotubes produced.

Example 6

Using the procedure of Exs. 4–5, ~20 mg $Mo(CO)_6$ was vaporized at 38–41° C. into the reactor zone which was set at 900° C. The feed gas comprised CO @0.8 SLM and $H_2$ @0.08 SLM and was fed at atmospheric pressure for 2.0 hrs. Vapor pressure of catalyst was nearly constant at ~0.6 torr.

TEM examination showed the presence of Mo nanoparticles, many ~1 nm diameter. The usual amorphous carbon and MWNT with diameters ranging from 4–10 nm were seen. However, SWNT, 1–3 nm in diameter were also produced at a yield of ~50% of the nanotubes produced.

Example 7

Examples 1–6 are summarized in Table I. Precursor was obtained as a powder from ALFA/AESAR, Research Chemicals and Materials. They were ground under an argon blanket to ~–100 mesh.

| Run # | CATALYST PRECURSOR | FEEDSTOCK COMPOSITION | REACTOR TEMP | VAPORIZER TEMP | STEM | SWNT |
|---|---|---|---|---|---|---|
| 1* | $Mo(CO)_6$ | CO-100% | 900° C. | NA | Mix of particles and MWNT/SWNT | <50% |
| 2* | $Mo(CO)_6$ | CO-100% | 900° C. | NA | Same as above; X-ray showed no Fe | <50% |

-continued

| Run # | CATALYST PRECURSOR | FEEDSTOCK COMPOSITION | REACTOR TEMP | VAPORIZER TEMP | STEM | SWNT |
|---|---|---|---|---|---|---|
| 3* | $Co_2(CO)_8$ | CO-100% | 900° C. | NA | Mostly particles, some SWNT strings | <25% |
| 4** | $Mo(CO)_6$ | CO-90% $H_2$-10% | 900° C. | 70–80° C. | Mostly particles, MWNT | trace |
| 5** | $Mo(CO)_6$ | CO-100% | 900° C. | 40–57° C. | Mostly particles and MWNT, some SWNT | <20% |
| 6** | $Mo(CO)_6$ | CO-90% $H_2$-10% | 900° C. | 38–41° C. | Particles, few MWNT, more SWNT | ~50% |

*Direct Injection Method
**Simulated Aerosol Method

Example 8

Ferrocene $(C_5H_5)_2Fe$ is substituted for the molybdenum hexacarbonyl in the procedure of Example 2 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 9

Ferrocene $(C_5H_5)_2Fe$ is substituted for the molybdenum hexacarbonyl in the procedure of Example 6 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 10

Methylcyclopentadienyl manganese tricarbonyl $(CH_3C_5H_4)Mn(CO)_3$ is substituted for the molybdenum hexacarbonyl in the procedure of Example 2 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 11

Methylcyclopentadienyl manganese tricarbonyl $(CH_3C_5H_4)Mn(CO)_3$ is substituted for the molybdenum hexacarbonyl in the procedure of Example 6 at an appropriate vapor pressure and temperature.

Examination of the grid in the TEM shows a mixture of particles and carbon nanotubes, both MW and SW. Particles vary from ~1—several hundred nm. The MWNT ranges from 4–10 nm diameter.

Examination of the grid also shows several areas containing SWNT. Diameters range between 1–2 nm. TEM estimate of the yield of SWNT was <50% of the carbon formed.

Example 12

Cyclopentadienyl cobalt dicarbonyl $(C_5H_5)Co(CO)_2$ is substituted for the molybdenum hexacarbonyl in the procedure of Example 2 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 13

Cyclopentadienyl cobalt dicarbonyl $(C_5H_5)Co(CO)_2$ is substituted for the molybdenum hexacarbonyl in the procedure of Example 6 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 14

Nickel dimethylglyoxime $(HC_4H_6N_2O_2)Ni$ is substituted for the molybdenum hexacarbonyl in the procedure of Example 2 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

Example 15

Nickel dimethylglyoxime $(HC_4H_6N_2O_2)Ni$ is substituted for the molybdenum hexacarbonyl in the procedure of Example 6 at an appropriate vapor pressure and temperature.

Examination of the grid in the TEM shows a mixture of particles and carbon nanotubes, both MW and SW. Particles vary from ~1—several hundred nm. The MWNT ranges from ~4–10 nm diameter.

Examination of the grid also shows several areas containing SWNT. Diameters range between 1–2 nm. TEM estimate of the yield of SWNT was <50% of the carbon formed.

What is claimed is:

1. A method for producing hollow, single-walled carbon nanotubes having diameters less than about 3 nanometers by catalytic decomposition of one or more gaseous carbon compounds comprising the steps of:
   (1) forming a gas phase mixture of:
      (a) a carbon feed stock gas comprising one or more gaseous carbon compounds, each said compound having one to six carbon atoms and only H, O, N, S or Cl as hetero atoms, optionally admixed with hydrogen, a diluent or mixtures thereof; and
      (b) a gas phase metal containing compound which is unstable under reaction conditions for said catalytic decomposition, and which forms metal containing catalysts which act as decomposition catalysts under reaction conditions;
   (2) and conducting said catalytic decomposition reaction under decomposition reaction conditions and thereby producing said hollow, single-walled carbon nanotubes having diameters less than about 3 nanometers.

2. A method for producing hollow, single-walled carbon nanotubes having diameters less than about 3 nanometers comprising the steps of:
   (1) forming a gas phase mixture of:
      (a) a carbon feed stock gas comprising one or more gaseous carbon compounds, each said compound having one to six carbon atoms and only H, O, N, S or Cl as hetero atoms, optionally admixed with hydrogen, a diluent or mixtures thereof; and
      (b) a gas phase metal containing compound which forms metal containing catalysts which act as decomposition catalysts under reaction conditions; and
   (2) conducting a reaction under said reaction conditions and thereby producing said hollow, single-walled carbon nanotubes having diameters less than about 3 nanometers.

3. The method as defined in claim 1, wherein said carbon feedstock gas comprises carbon monoxide.

4. The method as defined in claim 1, wherein said carbon feedstock gas consists essentially of carbon monoxide.

5. The method as defined in claim 1, wherein said decomposition reaction occurs at temperatures between approximately 400° C. and approximately 1300° C.

6. The method as defined in claim 1, wherein said decomposition reaction occurs at temperatures between approximately 400° C. and approximately 1100° C.

7. The method as defined in claim 1, wherein said decomposition reaction occurs at temperatures between approximately 400° C. and approximately 900° C.

8. The method as defined in claim 1, wherein said decomposition reaction occurs at temperatures between approximately 700° C. and approximately 1300° C.

9. The method as defined in claim 1, wherein said decomposition reaction occurs at temperatures between approximately 700° C. and approximately 1100° C.

10. The method as defined in claim 1, wherein said decomposition reaction occurs at temperatures between approximately 700° C. and approximately 900° C.

11. The method as defined in claim 1, wherein said decomposition reaction occurs at a pressure range of approaching 0 p.s.i.g. through approximately 100 p.s.i.g.

12. The method as defined in claim 1, wherein said gas phase metal containing compound is mixed with said feedstock by direct injection.

13. The method as defined in claim 1, wherein said gas phase metal containing compound is in the form of an aerosol.

14. The method as defined in claim 1, wherein said gas phase metal containing compound is a metal carbonyl.

15. The method as defined in claim 1, wherein said gas phase metal containing compound comprises iron carbonyl.

16. The method as defined in claim 1, wherein said gas phase metal containing compound comprises molybdenum carbonyl.

17. The method as defined in claim 1, wherein said gas phase metal containing compound comprises cobalt carbonyl.

18. The method as defined in claim 1, wherein said gas phase metal containing compound is $Mo(CO)_6$.

19. The method as defined in claim 1, wherein said gas phase metal containing compound is $CO_2(CO)_8$.

20. The method as defined in claim 1, wherein said gas phase metal containing compound is a volatile iron compound.

21. The method as defined in claim 20, wherein said volatile iron compound is ferrocene.

22. The method as defined in claim 1, wherein said gas phase metal containing compound is a volatile manganese compound.

23. The method as defined in claim 22, wherein said volatile manganese compound is methylcyclopentadienyl manganese tricarbonyl.

24. The method as defined in claim 1, wherein said gas phase metal containing compound is a volatile cobalt compound.

25. The method as defined in claim 24, wherein said volatile cobalt compound is cyclopentadienyl cobalt dicarbonyl.

26. The method as defined in claim 1, wherein said gas phase mixture consists essentially of said carbon feed stock gas and said gas phase metal containing compound, optionally admixed with hydrogen, a diluent or mixtures thereof.

27. The method as defined in claim 1, wherein said carbon nanotubes have diameters ranging from about 1 to about 3 nanometers.

28. The method as defined in claim 1, wherein said process provides a yield of single-walled carbon nanotubes greater than about 20 wt %.

29. The method as defined in claim 1, wherein said process provides a yield of single-walled carbon nanotubes greater than about 50 wt %.

30. The method as defined in claim 1, wherein said metal containing catalysts have diameters ranging from 1–10 nm.

* * * * *